United States Patent [19]

Summa

[11] 4,439,088
[45] Mar. 27, 1984

[54] BUCKET ATTACHMENT FOR TRACTORS

[75] Inventor: Gareth Summa, Platte County, Mo.

[73] Assignee: Summa-Rise, Denver, Mo.

[21] Appl. No.: 394,646

[22] Filed: Jul. 27, 1982

[51] Int. Cl.³ .............................................. B66C 23/36
[52] U.S. Cl. .................................. 414/703; 212/266; 414/722
[58] Field of Search ............... 414/703, 722, 727, 680, 414/715; 172/47, 445.1, 445.2; 212/266; 52/111-121

[56] References Cited

U.S. PATENT DOCUMENTS

| | | | |
|---|---|---|---|
| 3,593,858 | 7/1971 | Ruffin | 212/266 |
| 3,820,609 | 6/1974 | Trott | 172/445.2 |
| 4,042,141 | 8/1977 | Schweigert | 414/703 |

*Primary Examiner*—Robert J. Spar
*Assistant Examiner*—Donald W. Underwood
*Attorney, Agent, or Firm*—Kokjer, Kircher, Bradley, Wharton, Bowman & Johnson

[57] ABSTRACT

A mounting frame for attaching a bucket or other implement to a three-point tractor hitch. The frame is formed by two beams connected by a plate and by front and back cross braces. Each beam is made from a single piece of steel plate bent to provide a side plate, an inclined triangular top plate and a tapered rib. The side plates are pinned to the two draft links of the hitch and the ribs are reinforced and pinned to the upper hitch arm. The beams taper from front to back and terminate in spaced apart arms which carry the bucket. A trunnion mounted hydraulic cylinder for manipulating the bucket is mounted on the back cross brace and connected at its rod end to the bucket.

10 Claims, 4 Drawing Figures

U.S. Patent  Mar. 27, 1984  4,439,088
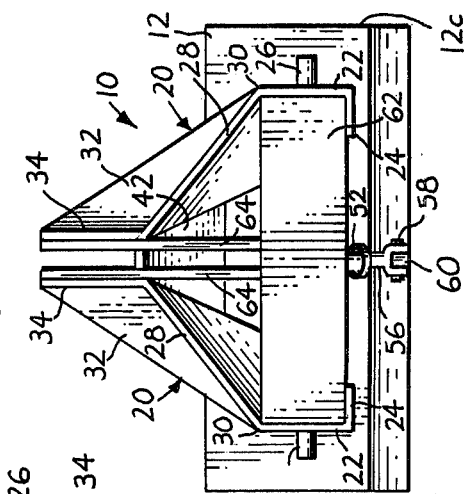
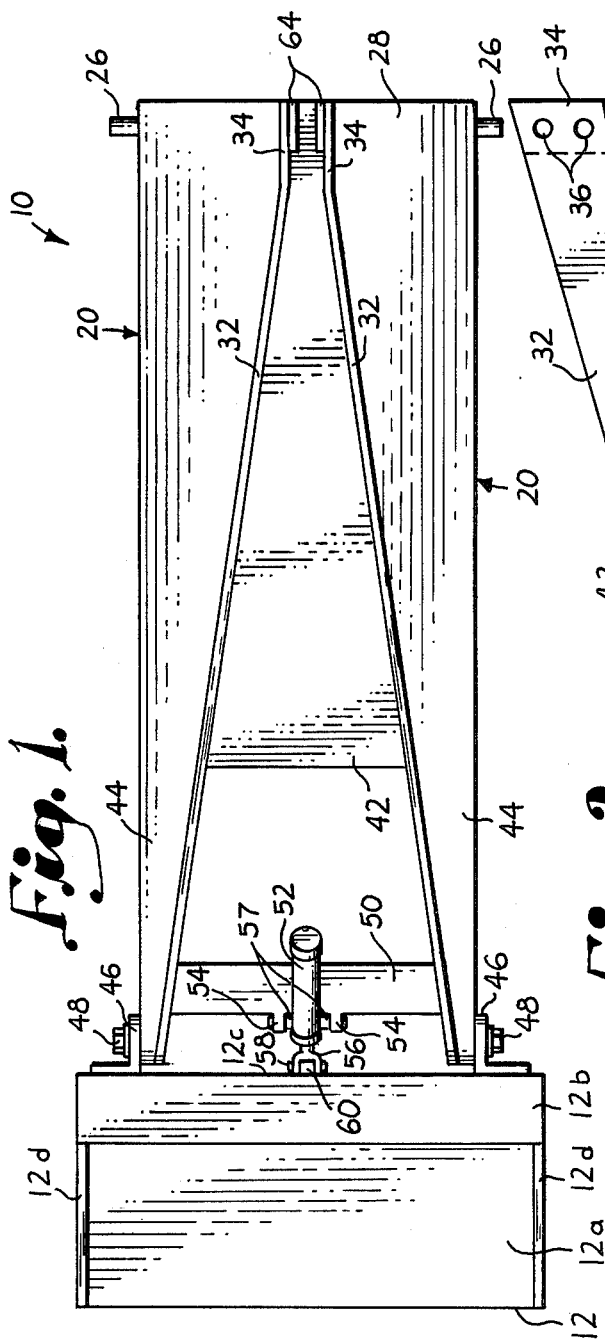
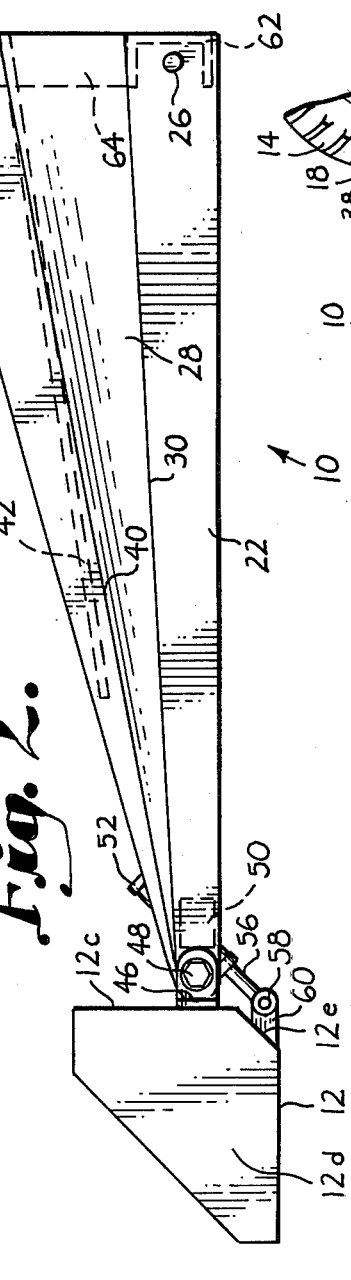

BUCKET ATTACHMENT FOR TRACTORS

BACKGROUND AND SUMMARY OF THE INVENTION

This invention relates generally to farm implements and more particularly to a frame which mounts a bucket or other implement on a three-point tractor hitch.

Front end loaders have long been used on farms to handle various types of materials such as dirt, ensilage and manure. However, the front end loader is a specialized machine having a cost that is often prohibitive. Various arrangements have also been proposed for mounting buckets on the front end of a tractor in order to provide the tractor with material handling capability. Mounting of the bucket on the front of a tractor requires the permanent addition of a suitable frame and other complex components to the tractor, and this is undesirable due both to the resulting cost increase and to the added complexity. When heavy loads are being handled, the stability of front mounted buckets is somewhat lacking, and overturning of the tractor and other serious safety problems are possible.

The drawbacks associated with front end loaders and front mounted buckets have long been recognized, and there have been attempts made to attach buckets and similar implements to the three-point hitch commonly located on the back end of a tractor. Examples of the types of arrangements that have been proposed are found in U.S. Pat. No. 4,068,774 to Howell; U.S. Pat. No. 3,362,554 to Fortier; U.S. Pat. No. 4,812,083 to Meldahl; U.S. Pat. No. 4,302,139 to Malish; U.S. Pat. No. 4,103,796 to Hare; U.S. Pat. No. 3,198,357 to Shelby; U.S. Pat. No. 3,187,912 to McKnight and U.S. Pat. No. 2,658,634 to Waller.

All of these devices are lacking in a number of respects, most notably in the strength and stability of the frames which attach the back mounted implement to the tractor hitch. Relatively long and thin mounting arms are unsatisfactory because they do not exhibit the necessary strength when heavy loads must be raised and considerable leverage is thereby applied to the frame, resulting in the exertion of substantial stress on the arms. The proposed devices are further characterized by complicated mechanical linkages and lever arrangements which increase their cost and complexity and detract from their reliability. Considerable time and difficulty are also involved in attaching the device to the tractor hitch and detaching it when the tractor is needed for other work.

The present invention is directed to an improved mounting arrangement for attaching a bucket or other implement to a three-point tractor hitch. It is the primary goal of the invention to provide a mounting frame which exhibits greater strength and stability than the devices that have been proposed in the past.

More specifically, it is an object of the invention to provide a back mounted implement having a frame which is strong enough to readily handle a full load while being maneuverable enough to manipulate the load as desired. The unique manner in which the frame is constructed, with a pair of sturdy beams formed from steel plate and connected by cross braces and a connecting plate, makes it considerably stronger than the previously proposed devices. The frame is constructed to permit the bucket to be raised high enough to deposit the contents over a fence 8 feet high. At the same time, the bucket can be maneuvered as required by the tractor hitch and by an added power cylinder that serves to load and unload the bucket.

It is another important feature of the invention that the frame is particularly well reinforced and strengthened at those areas of maximum stress, such as where it connects with the tractor hitch.

A further object of the invention is to provide a back mounted implement that can be quickly and easily connected to and disconnected from three-point tractor hitches of various styles.

Still another object of the invention is to provide a back mounted implement of the character described which is constructed in a simple and economical manner without the need for expensive specialized components.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith and in which like reference numerals are used to indicate like parts in the various views:

FIG. 1 is a top plan view showing a bucket attached to a mounting frame constructed according to a preferred embodiment of the present invention;

FIG. 2 is a side elevational view of the bucket and mounting frame;

FIG. 3 is a front elevational view of the bucket and mounting frame; and

FIG. 4 is a side elevational view on a reduced scale showing the mounting frame and bucket attached to the three-point hitch of a tractor.

Referring now to the drawing in more detail, numeral 10 generally designates a frame which is used to mount an implement such as a scoop or bucket 12 on a three-point tractor hitch. As shown in FIG. 4, the tractor hitch is located on the back end of a tractor between the two large rear wheels 14, and it includes two parallel draft links 16 and an upper hitch arm 18. The three-point hitch is constructed in a conventional and well known manner and can be raised or lowered to manipulate the attached implement accordingly.

Turning to the details of the frame 10, it includes two large beams generally indicated at 20. Each beam 20 is preferably formed from a single piece of ¼ inch steel plate which is bent in compound fashion into the desired configuration. The outside surface of each beam is formed by a side plate 22. Each side plate 22 is located in a vertical plane and is parallel to the other side plate. The side plates extend the full length of the beams, and their lower edges are turned inwardly at 90° to provide an inturned flange 24 (see FIG. 3) on the bottom of each beam. As best shown in FIG. 2, each side plate 22 gradually tapers slightly from front to back. An outwardly projecting pin 26 is secured to the forward end of each side plate 22. The pins 26 project outwardly from the side plates and permit the frame to be connected with the draft links 16 of the three-point tractor hitch. Pins 26 are co-axial.

The upper surface of each beam 20 is formed by an inclined top plate 28. The plates 28 are generally triangular and incline upwardly and inwardly at about 45° from the opposite side plates 22. The junctions between the side plates 22 and top plates 28 are formed by bend lines 30 located at the upper edges of the side plates and lower edges of the top plates. Each plate 28 is considerably broader at its front end portion and tapers substantially to a point at the back end of the beam.

A rib 32 extends upwardly from the upper edge of each top plate 28. Each rib 32 occupies a substantially vertical plane, and the two ribs diverge from front to rear, as best shown in FIG. 1. The forward end portions of the ribs 32 are indicated at 34 and are spaced apart from one another in parallel relation to receive the upper hitch arm 18 between them. Portions 34 of the ribs are provided with two sets of aligned holes 36 for receiving a pivot coupling 38 (see FIG. 4) used to pin the upper hitch arm 18 between the ribs. Two holes 36 are provided in order to accommodate different styles of tractor hitches. The ribs 32 are triangular in shape and taper substantially to a point from front to rear. Numeral 40 represents a bend line forming the intersection between rib 32 and the corresponding top plate 28.

Extending between the beams 20 is a connecting plate 42 which is generally horizontal although inclined upwardly somewhat from back to front. The connecting plate 42 is welded or otherwise secured to the opposing ribs 32. As best shown in FIG. 1, plate 42 is generally triangular and tapers from back to front. Plate 42 is preferably a steel plate about ¼ inch thick.

As shown particularly in FIG. 1, the beams 20 gradually taper from front to back and terminate in spaced apart arms 44 formed on the back ends of the beams behind the back edge of the connecting plate 42. The arms 44 are pivotally connected with the bucket 12 or with another implement which is to be mounted on the tractor hitch.

The bucket 12 is conventional in construction and includes a bottom plate 12a, a short top plate 12b, a back panel 12c, opposite sides 12d, and a heel plate 12e. A pair of ears 46 are secured to the back wall 12c by coaxial pivot couplings 48 which permit the bucket to pivot on frame 10 about a horizontal axis defined by the couplings.

A cross brace 50 in the form of a square tube extends rigidly between the arm portions 44 of beams 20. The brace 50 is spaced slightly forwardly of the back ends of the arms and is welded or otherwise secured to extend between the opposite side plates 22. A trunnion mounted hydraulic cylinder 52 is pivotally mounted between a pair of lugs 54 extending from the cross brace 50. The cylinder 52 has an extensible and retractable rod 56, and the body of the cylinder is mounted to the lugs 54 by means of trunnions 57 located near the rod end of the cylinder. The end of rod 56 carries a clevis which is pivotally pinned at 58 to an ear 60 secured to the heel plate 12e of the bucket. Extension and retraction of the rod 56 pivots bucket 12 about the pivot axis provided by the co-axial pivot couplings 48.

The front end of frame 10 is also provided with a cross brace 62. The brace 62 is formed by a channel welded to extend between the front end portions of side plates 22. The flanges 24 on the lower ends of side plates 22 are turned beneath both cross braces 50 and 62 and may be welded or otherwise secured to them.

A pair of parallel reinforcing plates 64 extend upwardly from the front cross brace 62. The reinforcing plates are welded at their lower ends to the top of brace 62 and near their mid points to the opposite edges of connecting plate 42 at the front end portion thereof. The reinforcing plates 64 extend upwardly above plate 52 along the inside surfaces of the front portions 44 of ribs 32. Plates 62 are welded or otherwise secured to portions 34 and are provided with holes that align with the holes 36 in the ribs.

In use, the frame 10 permits bucket 12 (or another implement) to be attached to the three-point tractor hitch. Attachment to the tractor hitch is carried out by pinning the draft links 16 to the pins 26 and pinning the upper hitch arm 18 between rib portions 34 by means of pivot coupling 38. When rod 56 is extended, bucket 12 is in the position shown in FIG. 4 so that dirt, ensilage, manure, or other materials can be loaded into the bucket. The three-point tractor hitch can then be raised to lift the bucket off of the ground for transport.

The frame 10 is long enough to permit bucket 12 to be raised over a fence eight feet high. Once the bucket has been raised above the fence, rod 56 can be retracted to pivot bucket 12 in a counterclockwise direction, thereby unloading the material in the bucket over the fence. In a similar manner, the materials carried in the bucket can be deposited in wagons, trucks, or other areas.

The unique manner in which frame 10 is constructed provides it with the strength required to handle the considerable loads that are encountered when bucket 12 is fully loaded with material. The two sturdy beams 20 are connected by plate 42 and by the cross braces 50 and 62 at the back and front. The taper and inclination of the top plates 28 adds to the strength of the frame while minimizing the amount of steel plate required to construct the frame. In addition, the tapered configuration of the beams, in cooperation with the connecting plate 42 and the cross braces 50 and 62, resists any tendency for the frame to twist or otherwise deform. The arrangement and configuration minimizes the weight and material cost without sacrificing strength.

It is noted that the front cross brace 62 is located adjacent to the pins 26 and directly below the rib portions 34 which connect with the upper hitch arm. In addition, the reinforcing plates 64 reinforce the rib portions 34 to provide considerable strength and reinforcement at the areas of connection with the tractor hitch. The rear cross brace 50 is located near the point of attachment to the bucket, while the inturned flanges 24 and the back portions of the top plates 28 provide the arm portions 44 with strong channel-like configurations at their back ends where the arms connect with the bucket. The trunnion mounted cylinder 52 permits the bucket or other implement to be manipulated throughout its operating arc with only a relatively small stroke of the cylinder (typically 8 inches).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A frame structure for attaching an implement such as a bucket to a three-point tractor hitch having a pair of draft links and a third hitch point, said frame structure comprising:
- a pair of rigid beams each having a back end portion providing an arm pivotally coupled with the implement in a manner permitting horizontal pivot axis, said beams having front end portions adapted to be pivotally coupled with the draft links of the tractor hitch;
- power means for effecting pivotal movement of the implement about said pivot axis;
- a side plate on each beam forming the outside surface thereof;
- a top plate of each beam inclining upwardly and inwardly from the corresponding side plate, each top plate being tapered from front to back;
- a rib extending generally upwardly from each top plate, said ribs being tapered from front to back and having spaced apart front end portions adapted to be pivotally coupled with the third hitch point of the tractor hitch;
- a connecting plate rigidly interconnecting said beams at a location above said side plates, said connecting plate beig tapered from back to front; and
- a cross brace extending between said side plates of the beams.

2. The invention of claim 1, wherein said arms extend rearwardly beyond said connecting plate and said cross brace extends between said arms.

3. The invention of claim 2, wherein said power means comprises a power cylinder having an extensible and retractable rod pivotally coupled with the implement and a body pivotally mounted on said cross brace.

4. The invention of claim 2, including a second cross brace extending between said plates at the front end portions of said beams.

5. The invention of claim 4, including an inturned flange on each side plate extending beneath the first and second cross braces.

6. The invention of claim 1, wherein said cross brace comprises a rigid channel member extending between said side plates at the front end portions of said beams.

7. The invention of claim 6, including a pair of reinforcing plates extending between said cross brace and connecting plate in generally parallel relationship to one another.

8. The invention of claim 7, wherein said reinforcing plates extend upwardly above said connecting plate and extend along and are connected to said front end portions of said ribs.

9. The invention of claim 8, including a rigid brace extending between and connected to said arms.

10. The invention of claim 1, wherein:
- said cross brace extends between said side plates at the front end portions of said beams at a location below the front end portions of said ribs;
- said connecting plate extends between and is rigidly secured to the front end portions of said ribs; and
- a pair of rigid reinforcing plates extend from said cross brace to said connecting plate and extend along and are secured to said front end portions of the ribs.

* * * * *